United States Patent [19]

Hymel

[11] Patent Number: 6,114,969
[45] Date of Patent: Sep. 5, 2000

[54] METHOD IN A SELECTIVE CALL RADIO FOR PRESENTING ADVERTISEMENT MESSAGES AND COUPONS

[75] Inventor: James Allen Hymel, Lake Worth, Fla.

[73] Assignee: Motorola, Schaumburg, Ill.

[21] Appl. No.: 09/166,755

[22] Filed: Oct. 5, 1998

[51] Int. Cl.[7] .................................................. G08B 5/22
[52] U.S. Cl. .................... 340/825.44; 455/38.1; 455/38.4; 379/58; 340/825.22; 340/825.27; 340/825.26
[58] Field of Search ..................... 340/825.44, 825.69, 340/825.72, 825.22, 825.38; 455/38.1, 38.4; 379/57, 58; 235/382, 382.5

[56] References Cited

U.S. PATENT DOCUMENTS

| | | | |
|---|---|---|---|
| 5,446,678 | 8/1995 | Saltzstein et al. | |
| 5,870,030 | 2/1999 | DeLuca et al. | 340/825.44 |
| 5,926,104 | 2/1999 | Robinson | 340/825.22 |

*Primary Examiner*—Michael Horabik
*Assistant Examiner*—Anthony A. Asongwed
*Attorney, Agent, or Firm*—Pablo Meles

[57] ABSTRACT

A SCR (122) capable of communicating with a communications center (102) includes a RF receiver (304), a presentation circuit (313), and a processor (308). The processor is adapted to select an advertisement source from a plurality of advertisement sources (502), select an information service from a plurality of information services (504), cause the RF receiver to receive from the communications center advertisement information and a message originating from the information service (506), and cause the presentation circuit to present information to a user of the SCR representative of the message and advertisement information, and the information service and the advertisement source selected (508–534).

13 Claims, 5 Drawing Sheets

GAME BOARD

*600*

METHOD IN A SELECTIVE CALL RADIO FOR PRESENTING ADVERTISEMENT MESSAGES AND COUPONS

RELATED INVENTIONS

The present invention is related to the following inventions which are assigned to the same assignee as the present invention:

Application Ser. No. 08/627,642 filed Mar. 30, 1996 by Deluca et al., entitled "Advertiser Pays Information and Messaging System and Apparatus;" now U.S. Pat. No. 5,870,030 and Application Ser. No. 09/036,978 filed Mar. 9, 1998 by Hymel, entitled "Controlling Access to a Feature of a Selective Call Receiver that Stores Advertisements;" now U.S. Pat. No. 6,008,739 and Application Ser. No. 09/144,236 filed Aug. 31, 1998 by Hymel, entitled "Method in a Selective Call Radio for Ensuring Reception of Advertisement Messages;" now U.S. Pat. No. 6,031,467 and Application Ser. No. 09/104,245 filed Jun. 24, 1998 by Hymel, entitled "Radio Communication System for Communicating Scheduled Messages and Method Therefor;" now pending.

FIELD OF THE INVENTION

This invention relates in general to communication systems delivering radio messages, and particularly, to a method in a selective call radio for presenting advertisement messages and coupons.

BACKGROUND OF THE INVENTION

Radio communication systems that transmit selective call messages to SCRs (selective call radios), such as cellular phones and pagers, have been in use for some time now. The type of selective call messages transmitted to SCRs range anywhere from personal messaging (e.g., pages, telephonic messages) to information services (e.g., advertising, news, weather, etc.).

To augment the number of SCRs in use, service providers are teaming up with advertisers to provide free service to end users. Such a team effort benefits both service providers and advertisers. That is, by providing free service, service providers increase their sales volume of SCRs, while advertisers disseminate advertisement messages, with at times, redeemable coupons to lure consumers to purchase the advertised products.

Accordingly, a need exists for a method in a selective call radio for presenting advertisement messages and coupons to users of the SCRs.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
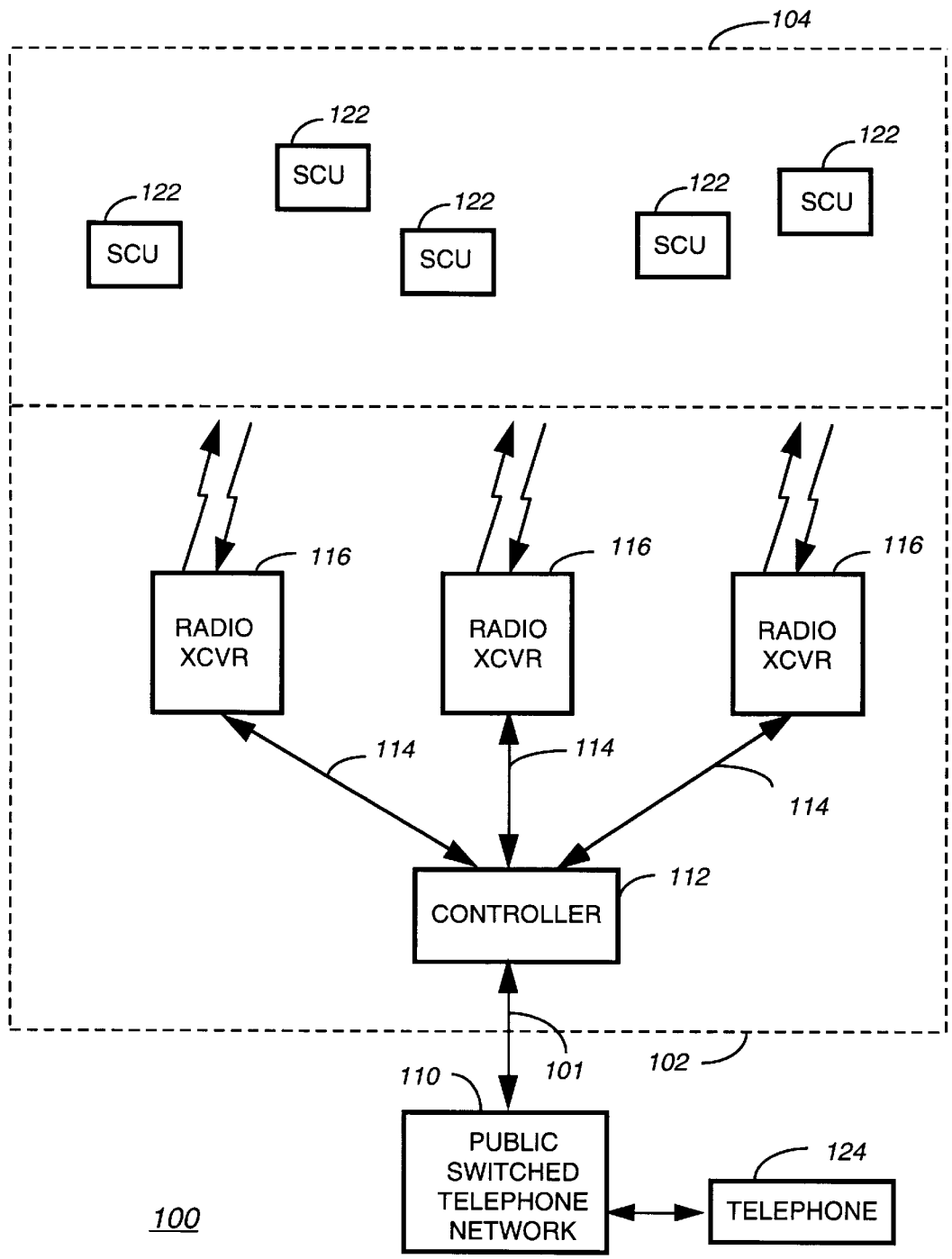
FIG. 1 is an electrical block diagram of a radio communication system utilized by the present invention.

FIG. 1 is an electrical block diagram of a radio communication system 100 according to the present invention. The radio communication system 100 comprises a communications center 102 that communicates to a portable portion 104 including a plurality of SCRs 122 (selective call radios). The communications center 102 includes a controller 112 for controlling operation of a plurality of radio transceivers 116 by way of conventional communication links 114, such as, e.g., microwave links. The plurality of SCRs 122 in the portable portion 104 are used for receiving selective call messages from the radio transceivers 116 under the control of the controller 112.

The controller 112 receives messages from callers utilizing a conventional telephone 124 for communicating with a conventional PSTN (public switch telephone network) 110 or, alternatively, the controller 112 receives messages from any one of a plurality of information services provided by the communications center 102 (e.g., e-mail, news updates, stock quotes, etc.). When messages arrive through the PSTN 110, these messages are relayed to the controller 112 through a conventional telephone line 101 coupled to the controller 112. Upon receiving messages from the PSTN 110, the controller 112 processes the messages, and delivers them to the radio transceivers 116 for transmission to designated SCRs 122. In addition to transmitting selective call messages, the controller 112 is programmed to either selectively transmit or broadcast advertisements information to the plurality of SCRs 122.

Figure 2:
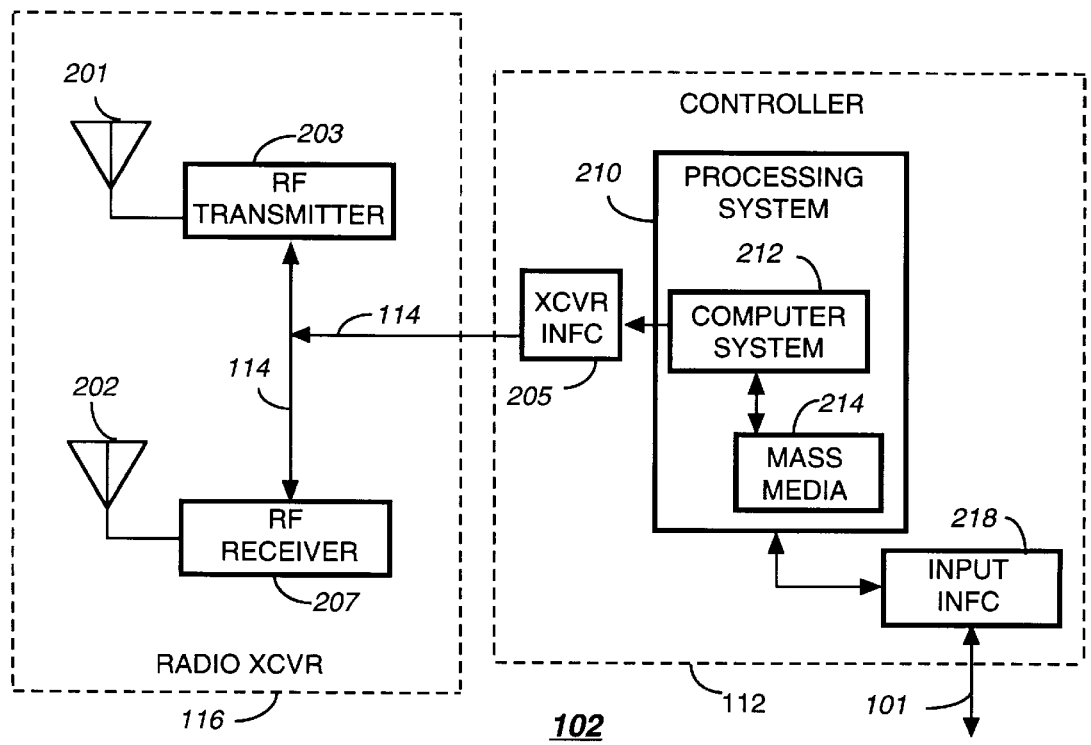
FIGS. 2 and 3 are electrical block diagrams of the communications center and the SCR (selective call radio) of FIG. 1, respectively.
Figure 3:
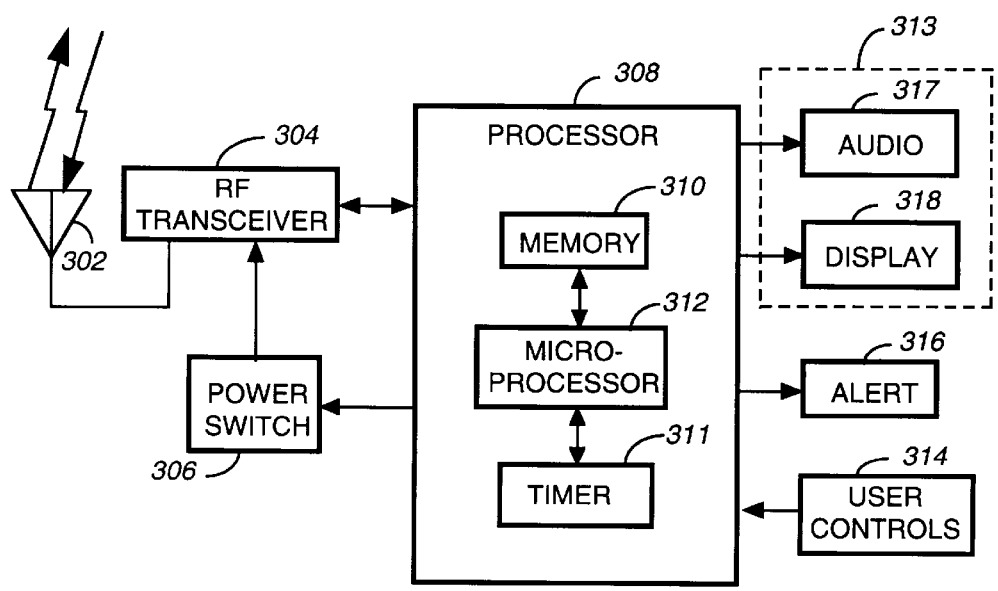

FIGS. 2 and 3 are electrical block diagrams of the communications center 102 and the SCR 122 of FIG. 1, respectively. The electrical block diagram of the communications center 102 includes the elements of the controller 112 and the radio transceiver 116. The controller 112 comprises a conventional processing system 210 for controlling operation of the radio transceivers 116, a conventional caller interface 218 for receiving messages from the PSTN 110, and a conventional transceiver interface 205 for communicating messages to the radio transceivers 116. The processing system 210 includes conventional hardware such as a computer system 212 and mass media 214 to perform the programmed operations of the controller 112. The radio transceivers 116 comprise a conventional RF transmitter 203 coupled to an antenna 201 for transmitting messages to the SCRs 122. Additionally, the radio transceivers 116 comprise a conventional RF receiver 207 coupled to an antenna 202 for receiving messages transmitted by the SCRs 122.

The SCR 122 comprises an antenna 302 for transmitting and intercepting RF signals to and from the communications center 102, and a RF transceiver 304 coupled thereto capable of performing conventional demodulation and modulation techniques for transmitting and receiving communication signals to and from the communications center 102. Radio signals received by the RF transceiver 304 produce demodulated information, which is coupled to a processor 308 that processes the received messages. Analogously, the processor 308 generates messages which are then modulated and transmitted to the communications center 102 by the RF transceiver 304. A conventional power switch 306, coupled to the processor 308, is used to control the supply of power to the RF transceiver 304 from a conventional battery source, thereby providing a battery saving function.

To perform the necessary functions of the SCR 122, the processor 308 includes a microprocessor 312, and a memory 310 that includes, for example, a random access memory (RAM), a read-only memory (ROM), and an electrically erasable programmable read-only memory (EEPROM). The processor 308 is programmed by way of the ROM to process incoming messages transmitted by the communications center 102, and to generate and transmit messages originated by the user of the SCR 122 to the communications center 102. When receiving messages from the communications center 102, the processor 308 decodes an address in the demodulated data of the received message, compares the decoded address with one or more addresses assigned and stored in the EEPROM of the SCR 122, and when a match is detected, proceeds to process the remaining portion of the message.

In the event a match is detected, the processor 308 stores the message in the RAM, and a call alerting signal is generated depending on the type of message received. The call alerting signal is directed to a conventional audible or tactile alerting device 316 for generating an audible or tactile call alerting signal. The message can be accessed by the user through user controls 314, which provide functions such as lock, unlock, delete, read, etc. More specifically, by the use of appropriate functions provided by the user controls 314, the message is recovered from the RAM, and conveyed to the user by way of a presentation circuit 313, which includes, for example, a display 318 (e.g., a conventional liquid crystal display—LCD) for visualizing messages and an audio circuit 317 for audio messages.

Preferably, the radio communication system 100 employs one of the FLEX™ family of communication protocols (e.g., FLEX™, ReFLEX™, InFLEXion™), developed by Motorola, Inc., for communicating messages to the SCRs 122. The FLEX™ family of protocols are digital selective call signaling protocols that are presently used by various system operators in the United States and in several other countries. It will be appreciated that, alternatively, other digital signaling protocols may be used that are suitable with the present invention.

Figure 4:
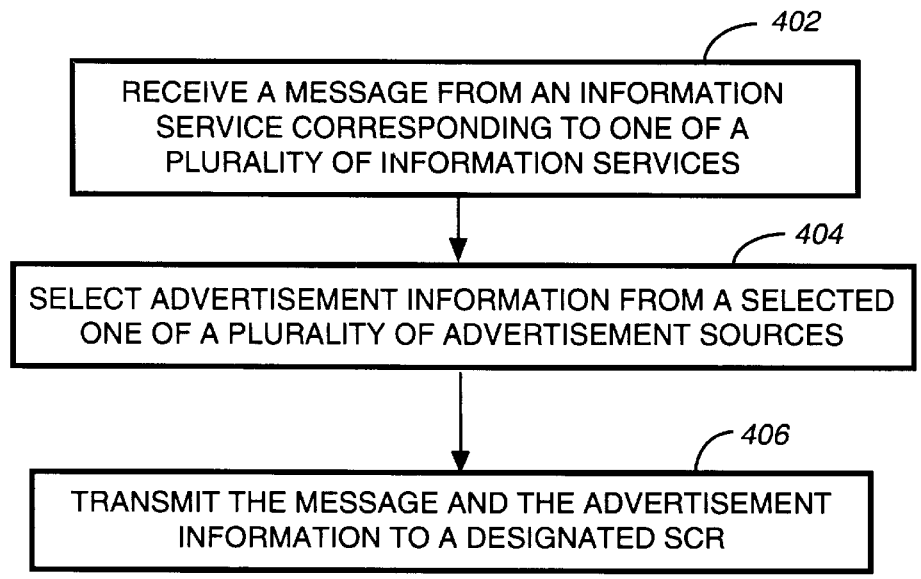
FIGS. 4–6 depict flowcharts summarizing the operations of the communications center and the SCR, respectively, according to the present invention.
Figure 5:
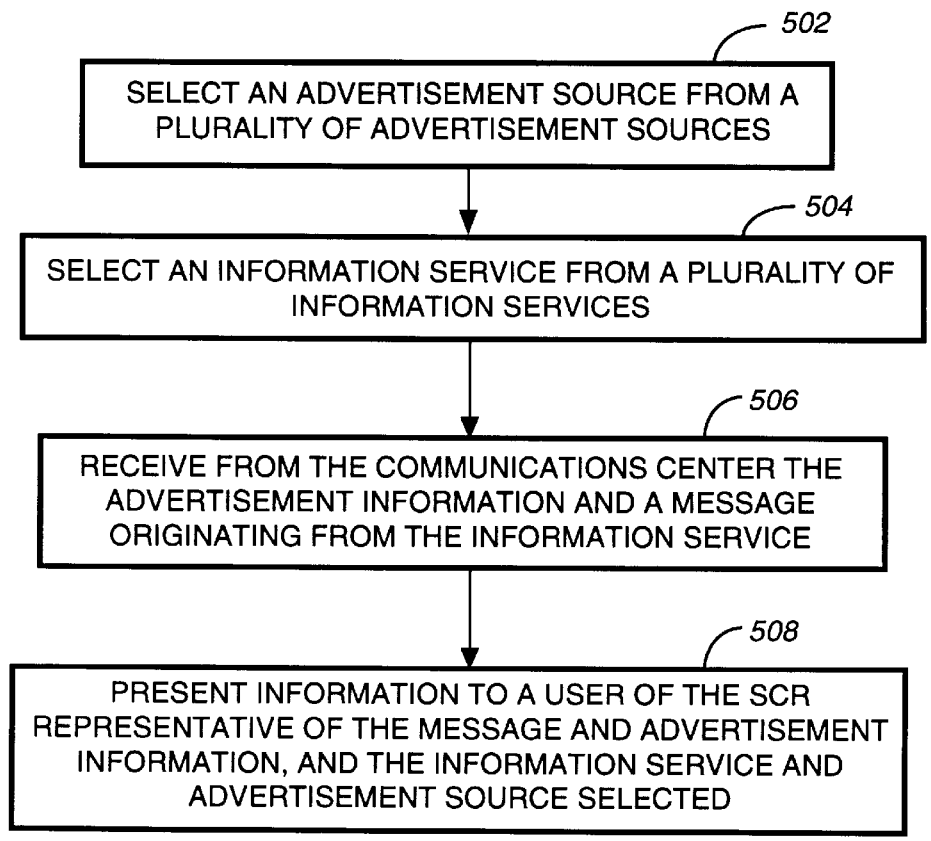
Figure 6:
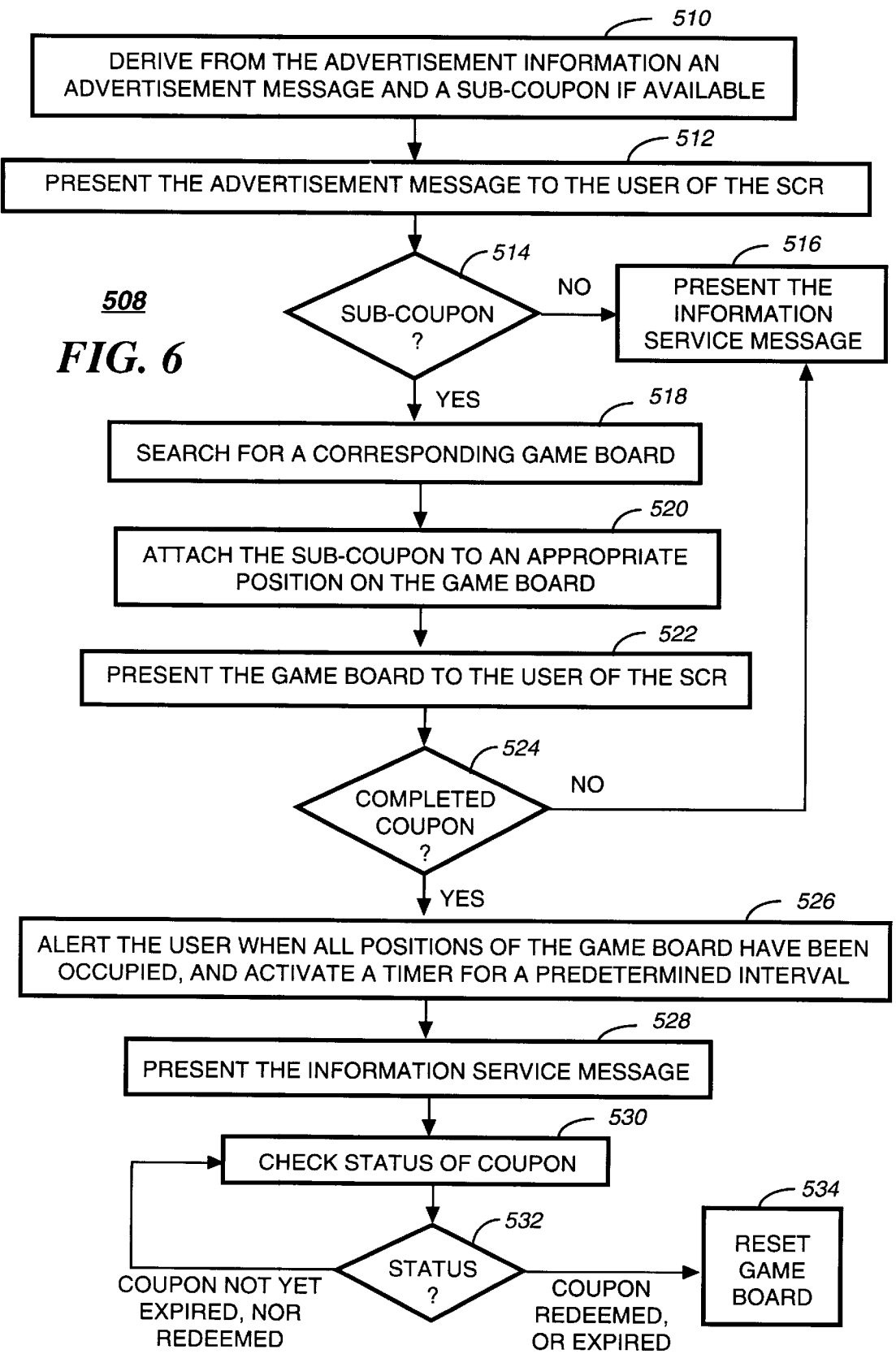

FIGS. 4–6 depict flowcharts summarizing the operations of the communications center 102 and the SCR 122, respectively, according to the present invention. The programmed operations depicted in FIGS. 4–6 are preferably programmed into the respective memories 214, 310 of the communications center 102 and the SCR 122. As noted in the Background of the Invention above, by providing free communication services, consumers are likely to be willing to utilize an SCR 122 under conditions where messages are often accompanied with advertisement information. As it will become apparent shortly, these flowcharts illustrate an optimal method for presenting advertisement information along with information service messages to consumers utilizing SCRs 122.

Flowchart 400, which illustrates the operational steps of the communications center 102, begins with step 402. In this step, the communications center 102 receives a message from an information service that corresponds to one of a plurality of information services provided by the communications center 102. In step 404, the communications center 102 selects advertisement information from a selected one of a plurality of advertisement sources.

Preferably, the selection step is a result of associating each of the plurality of advertisement sources with each of the plurality of information services. It will be appreciated that each information service may be associated with one or more advertisement sources. However, to better illustrate the present invention, each information service is assumed to be associated with only one advertisement source. It would be relatively trivial for one of ordinary skill in the art to expand the examples below to include more than one association of the advertisement sources with each of the plurality of information services.

Take for example, an information service that provides news updates and which is associated with an advertisement source of a particular merchant (e.g., one that sells automobiles). Each time a news update message is received from its corresponding information service, advertisement information pertaining to the automobile merchant is generated by the communications center 102 in step 404. Preferably, the advertisement information consists of indexes which point to an advertisement message and coupon information stored in the SCR 122. The advertisement message and coupon information are received and stored by the SCR 122 at an earlier time when message traffic is low (e.g., during the evening hours). The transmission of indexes is preferred over the transmission of the advertisement message and coupon information itself, because in this latter embodiment more information needs to be transmitted. It will be appreciated, however, that although less efficient, this latter embodiment is compatible and may be utilized by the present invention.

In an alternative embodiment, it is not a requirement for the selection step to be the result of associating each of the advertisement sources with each of the information services at the communications center 102. Rather, the indexes may be representative of a random selection of an advertisement message and coupon information stored in the SCR 122. To avoid selecting the same advertisement message and coupon information stored in the SCR 122, the communications center 102 preferably selects different indexes per transmission of advertisement information to the SCRs 122.

It will become apparent during the discussion of the operations of the SCR 122 that under the present embodiment of the selection step, the communications center 102 has no way of knowing which advertisement message and coupon information is selected at the SCR 122. The selection process at the SCR 122 is instead controlled by the user of the SCR 122 who associates advertisement sources and information services by way of user preferences. This embodiment will be discussed shortly.

Once the information service message and advertisement information have been processed as a result of steps 402–404, the communications center 102 proceeds to step 406 where it causes the RF transmitter 203 to transmit the message and the advertisement information to the SCR 122. What occurs at the SCR 122 after step 406 is illustrated by flowchart 500 depicted in FIGS. 5 and 6.

Flowchart 500 begins with step 502. In this step, an advertisement source is selected from a plurality of advertisement sources. Similarly, in step 504, an information service is selected from a plurality of information services. These steps are preferably are the result of a user of the SCR 122 making these selections by operating the user controls 314 of the SCR 122. The user makes these selections as user preferences after viewing by way of the display 318 a menu of advertisement sources and information services which the SCR 122 is capable of receiving. In a first embodiment, the user associates an advertisement source with an information service as a way of enabling the information service. In an alternative embodiment, each information service is pre-assigned to an advertisement source and it is up to the user of the SCR 122 to enable the information service, which in turn enables the advertisement source. In either case, the user of the SCR 122 is forced to view advertisement information each time information service messages are received from the information services that were enabled.

Once the user has made his selections in steps 502–504, the SCR 122 is ready to receive information service messages and advertisement information. Upon detecting transmission from the communications center 102 of an information service message, the SCR 122 proceeds to step 506 where it receives advertisement information and the message originating from the information service. In step 508, the SCR 122 presents information to the user of the SCR 122 representative of the message and advertisement information, and the information service and the advertisement source selected in steps 502–504.

The method for presenting information to the user in step 508 is depicted in FIG. 6. This flowchart begins with step 510 where the SCR 122 derives from the advertisement information an advertisement message and a sub-coupon, if available. In a first embodiment, consistent with the one described above for the communications center 102, the advertisement information comprises indexes. One of these indexes points to an advertisement message previously stored in the memory 310 of the SCR 122. The other index points to a sub-coupon also previously received and stored in the memory 310 of the SCR 122. In an alternative embodiment, the advertisement information includes the advertisement message and sub-coupon, if available, that is to be presented to the user of the SCR 122. In yet another embodiment, the advertisement information includes a wild sub-coupon. The use and operation of the wild sub-coupon will be described shortly.

In either embodiment, the SCR 122 presents, in step 512, the advertisement message to the user of the SCR 122 prior to displaying the message received from the information service. This step is important so as to prevent a user from circumventing viewing advertisement messages by reading only information service messages. As a reward or incentive to a user of the SCR 122 for reading advertisement messages, each advertiser provides redeemable coupons to users who often read their advertisements. The redeemable coupons are preferably constructed out of sub-coupons which are transmitted with each occurrence of an advertiser's message.

Figure 7:
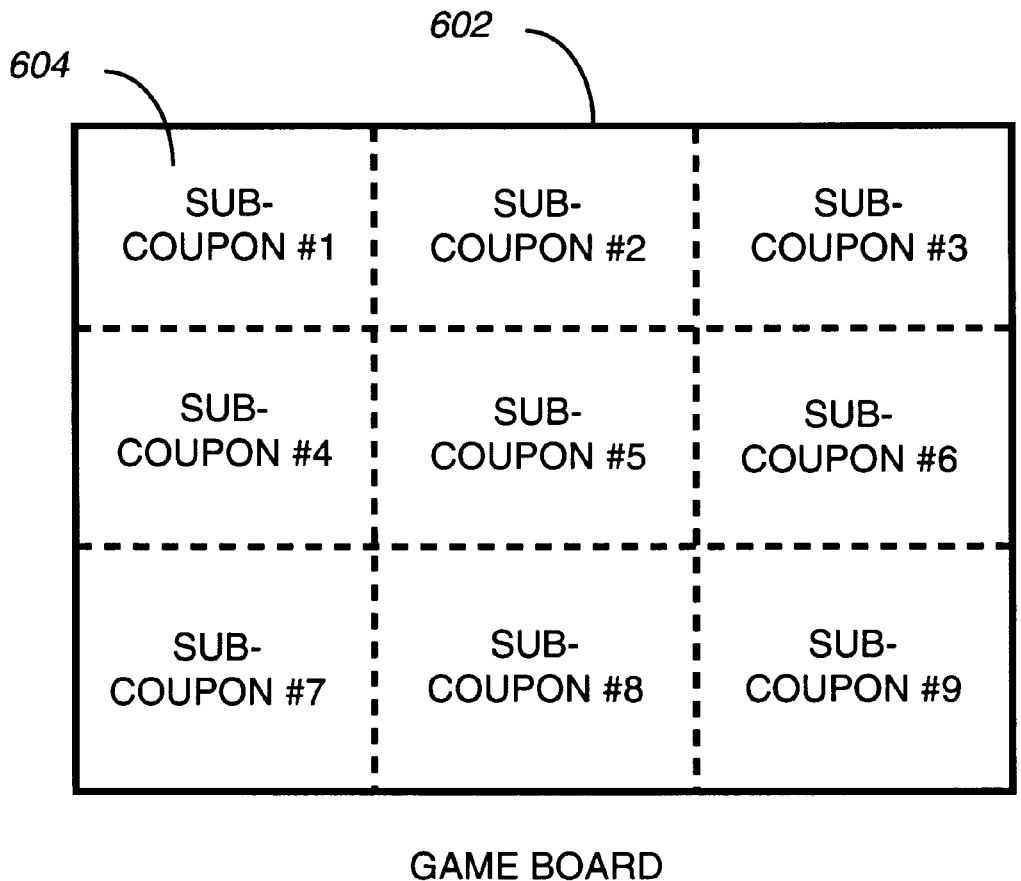
FIG. 7 shows a coupon game board according to the present invention.

A coupon 602 is constructed from a game board 600 as shown in FIG. 7 made up of several sub-coupons 604. It will be appreciated, however, that there may be times when an advertiser may want to send a redeemable coupon after a single transmission to a user (i.e., a game board consisting of a single sub-coupon). The number of sub-coupons 604 necessary to construct a redeemable coupon may depend, for example, on the value of the coupon being offered, and ultimately serves as an incentive for the end user of the SCR 122 to continue receiving advertisements from the advertiser offering the coupon.

It should be noted that it is not necessary that each message received from a particular information service be accompanied by advertisement information including a sub-coupon. Again the frequency for which sub-coupons are transmitted to end users of the SCRs 122 may depend on the advertisers' marketing goals. Consequently, in step 514, the SCR 122 checks for the presence of a sub-coupon 604 or sub-coupon index pointing thereto in the advertisement information. If a sub-coupon 604 is not found, the SCR 122 proceeds to step 516 where it presents the information service message to the user of the SCR 122. Otherwise, the SCR 122 proceeds to step 518 where it searches for a corresponding game board 600 in the memory 310 of the SCR 122.

In the case where the user has randomly associated an information service to an advertisement source, the game board 600 is selected according to the advertisement source associated with the information service from which the message was received. Alternatively, if advertisement sources have been pre-assigned to designated information services, then the game board 600 is selected according to the pre-assigned association between the information service from which the message was received and its corresponding advertisement source. Once the game board 600 has been selected in step 518, the SCR 122 proceeds to step 520 where it attaches the sub-coupon 604 to its corresponding position on the game board 600. The position of the sub-coupon 604 is preferably derived from information included in the sub-coupon itself. For example, a sub-coupon 604 may include information consisting of its position on the game board 600, and the portion of the coupon 602 which the sub-coupon 604 corresponds to and the graphics associated with this portion.

In the case of a wild sub-coupon, the SCR 122 determines how may positions in the game board 600 are not yet occupied by corresponding sub-coupons 604. For these unoccupied positions, the SCR 122 activates in response to receiving the wild sub-coupon an algorithm programmed into the memory 310 of the SCR 122 that randomly determines whether to occupy the unoccupied positions with corresponding sub-coupons. This algorithm is preferably a conventional software-driven random number generator that generates a sequence of numbers corresponding to the positions unoccupied in the game board 600. If, for example, the random number generated is in sequence with the unoccupied positions, then all the unoccupied positions in the game board 600 are occupied by their corresponding sub-coupons.

To best understand this embodiment, an example based on the game board 600 shown in FIG. 7 follows. Assume that sub-coupons 604 have been attached to positions 1–3 and 7–9 of the game board 600, and that positions 4–6 are unoccupied. In response to receiving a wild sub-coupon, the SCR 122 in step 520 activates the random number generator. The generator is pre-programmed to generate the numbers 4, 5 and 6 in any sequential order in response to a generic seed that is, for example, stored in the memory 310 of the SCR 122. If the random number generator generates the sequence 5, 6, 4, then the game board 600 remains unchanged, and the user of the SCR 122 is notified that the game board 600 has not received any new sub-coupons 604. However, if the user of the SCR 122 is "lucky" enough to have the random number generator generate the sequence 4, 5, 6, then the SCR 122 attaches to the game board 600 the remaining sub-coupons 604 stored in the memory 310. This embodiment has the benefit of further motivating end users of the SCR 122 to read advertisement messages by utilizing conventional gambling techniques.

It will be appreciated by one of ordinary skill in the art that alternative approaches for randomly occupying positions in the game board 600 may be used, and that these variations may be a part of the algorithm used by the SCR 122.

Once the game board 600 has been updated according to the foregoing embodiments, the SCR 122 proceeds to step 522 where it presents the game board 600 to the user of the SCR 122. In the case where the sub-coupon 604 received is a repeated sub-coupon 604 from a previous transmission, or a wild sub-coupon did not update the game board 600, the user of the SCR 122 is notified that the game board 600 has received no new pieces contributing to the construction of the coupon 602. If, however, a new sub-coupon 604 has been received, or the game board 600 was updated in response to a wild-sub-coupon, the user is notified of the additional sub-coupon(s) 604 by, for example, flashing the additional piece(s). Once the game board 600 has been presented, the SCR 122 checks in step 524 whether construction of the coupon 602 has been completed. If not, the SCR 122 proceeds to step 516 where it presents the information service message to the user.

When all positions of the game board 600 have been occupied, the user is alerted in step 526 (e.g., by activating the alerting device 316) indicating that the user has been awarded a redeemable coupon at a designated merchant. Contemporaneous with this alert, the SCR 122 activates a timer 311 for a predetermined interval, and notifies the user that the coupon 602 is redeemable only during the predetermined interval (e.g., 1 month). Upon notifying the user of the coupon 602 and its limitations, the SCR 122 presents the information service message in step 528 to the user. Once the user has viewed the message, the SCR 122 checks the status of the coupon 602 in step 530. If, in step 532, the coupon 602 has not yet expired (i.e., no an alert has been received from the timer 311), nor has been redeemed by the user, the SCR 122 continues to check the status of the coupon 602 in step 530.

Note, although not shown in FIG. 6, the user of the SCR 122 preferably redeems the coupon 602 by presenting the coupon 602 to the designated merchant for a predetermined time (e.g., 15 seconds) by operating user controls 314 of the SCR 122. For example, the user can present the coupon 602 by way of the display 318 to the merchant by depressing the read button of the user controls 314. Upon displaying the coupon 602, the SCR 122 proceeds to step 534 where it resets the game board 600 discarding all sub-coupons 604 attached to the game board 600. Similarly, upon expiration of the timer 311, the game board 600 is reset in step 534. However, upon expiration of the timer 311, the game board 600 may be reset in such a way that rather than discarding all sub-coupons 604 attached to the game board 600 as just discussed, only one or two sub-coupons 604 are discarded at a time. In this manner, the end user of the SCR 122 will be less disappointed in the event that the user forgot or was unable to redeem the coupon 602 within the prescribed time set forth by the timer 311. Preferably, the discarded sub-coupons 604 may be reacquired in the future after additional messages including advertisement information is received.

It will be appreciated that for the foregoing embodiments, the SCR 122 can be programmed to transmit to the communications center 102 information representative of the advertisement source and information service selected by the user of the SCR 122 as user preferences. This information can be used by the service provider to provide demographic information to advertisers who may which to know, for example, the frequency for which their advertisements are selected along with the frequency for which advertisements from competitors have been selected by users of the SCRs 122.

As should be evident from the discussions above, the present invention is substantially advantageous over the prior art. Particularly, the present invention provides a method in a SCR 122 for presenting advertisement messages and coupons. The above embodiments illustrate how advertisement messages and coupons can be presented to a user of an SCR 122 in an optimal fashion. Additionally, by the use of two-way communications, the SCRs 122 can be programmed to transmit user preference information to the communications center 102. Consequently, service providers can furnish demographic information useful to advertisers.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a SCR (selective call radio) that communicates with a communications center, a method comprising the steps of:
   selecting an advertisement source from a plurality of advertisement sources;
   selecting an information service from a plurality of information services;
   receiving from the communications center advertisement information and a message originating from the information service;
   presenting information to a user of the SCR representative of the message and advertisement information, and the information service and the advertisement source selected, wherein the method further comprises the steps of:
      generating a game board for each of the plurality of advertisement sources, wherein each game board has one or more positions for accepting at least one sub-coupon;
      attaching the sub-coupon to the one or more positions of the game board corresponding to the advertisement source selected wherein the sub-coupon indicates a position within the one or more positions of the game board; and
      alerting the user of the SCR when all of the one or more positions of the game board have been occupied, thereby indicating that the user has a coupon that is redeemable at a designated merchant.

2. The method as recited in claim 1, wherein the steps of alerting the user comprises the steps of:
   activating a timer for a predetermined interval; and
   notifying the user that the coupon is redeemable only during the predetermined interval.

3. The method as recited in claim 2, further comprising the step of resetting the game board by discarding at least one sub-coupon attached to the game board upon receiving an alert from the timer indicating that the user has not redeemed the coupon during the predetermined interval.

4. The method as recited in claim 1, wherein the user redeems the coupon by presenting the coupon to the designated merchant by operating user controls of the SCR.

5. The method as recited in claim 4, wherein after presenting the coupon to the designated merchant for a predetermined time, the method comprises the step of resetting the game board by discarding all sub-coupons attached to the game board.

6. In a SCR (selective call radio) that communicates with a communications center, a method comprising the steps of:
   selecting an advertisement source from a plurality of advertisement sources;
   selecting an information service from a plurality of information services;
   receiving from the communications center advertisement information and a message originating from the information service; and presenting information to a user of the SCR representative of the message and advertisement information, and the information service and the advertisement source selected, wherein the advertisement information includes an index pointing to a sub-coupon, and wherein the method further comprises the steps of:

generating a game board for each of the plurality of advertisement sources, wherein each game board has one or more positions for accepting at least one sub-coupon;

attaching the sub-coupon pointed to by the index to the one or more positions of the game board corresponding to the advertisement source selected, wherein the sub-coupon indicates a position within the one or more positions of the game board; and alerting the user of the SCR when all of the one or more positions of the game board have been occupied, thereby indicating that the user has a coupon that is redeemable at a designated merchant.

7. The method as recited in claim 6, wherein the steps of alerting the user comprises the steps of:

activating a timer for a predetermined interval; and notifying the user that the coupon is redeemable only during the predetermined interval.

8. The method as recited in claim 7, further comprising the step of resetting the game board by discarding at last one sub-coupon attached to the game board upon receiving an alert from the timer indicating that the user has not redeemed the coupon during the predetermined interval.

9. The method as recited in claim 6, wherein the user redeems the coupon by presenting the coupon to the designated merchant by operating user controls of the SCR.

10. The method as recited in claim 9, wherein after presenting the coupon to the designated merchant for a predetermined time, the method comprises the step of resetting the game board by discarding all sub-coupons attached to the game board.

11. In a SCR (selective call radio) that communicates with a communications center, a method comprising the steps of:

selecting an advertisement source from a plurality of advertisement sources;

selecting an information service from a plurality of information services;

receiving from the communications center advertisement information and a message originating from the information service; and presenting information to a user of the SCR representative of the message and advertisement information, and the information service and the advertisement source selected, wherein the advertisement information includes a wild sub-coupon, the SCR having in its memory a game board corresponding to the advertisement source selected, the game board having one or more positions for accepting at least one sub-coupon, and the game board having at least one position not yet occupied by a corresponding sub-coupon, and wherein the method further comprises the step of activating an algorithm operating in the SCR in response to receiving the wild sub-coupon that randomly determines whether to occupy the at least one position not yet occupied by the corresponding sub-coupon.

12. In a communications center, a method comprising the steps of:

receiving a message at a selective call radio (SCR) from an information service corresponding to one of a plurality of information services;

selecting advertisement information from a selected one of a plurality of advertisement sources, wherein the advertisement information includes first and second indexes, whereby the first index points to an advertisement message stored in the SCR, and whereby the second index points to a sub-coupon stored in the SCR; and transmitting the message and the advertisement information to a designated SCR.

13. A communications center, comprising:

a RF transmitter;

a processing system coupled to the RF transmitter, the processing system adapted to:

receive a message from an information service corresponding to one of a plurality of information services;

select advertisement information from a selected one of a plurality of advertisement sources, wherein the advertisement information includes first and second indexes, whereby the first index points to an advertisement message stored in a selective call radio (SCR), and whereby the second index points to a sub-coupon stored in the SCR; and cause the RF transmitter to transmit the message and the advertisement information to a designated SCR.

* * * * *